US011373065B2

United States Patent
Davis

(10) Patent No.: US 11,373,065 B2
(45) Date of Patent: Jun. 28, 2022

(54) DICTIONARY BASED DEDUPLICATION OF TRAINING SET SAMPLES FOR MACHINE LEARNING BASED COMPUTER THREAT ANALYSIS

(71) Applicant: Cylance Inc., Irvine, CA (US)

(72) Inventor: Andrew Davis, Portland, OR (US)

(73) Assignee: Cylance Inc., San Ramon, CA (US)

( * ) Notice: Subject to any disclaimer, the term of this patent is extended or adjusted under 35 U.S.C. 154(b) by 976 days.

(21) Appl. No.: 15/873,673

(22) Filed: Jan. 17, 2018

(65) Prior Publication Data

US 2018/0211140 A1 Jul. 26, 2018

Related U.S. Application Data

(60) Provisional application No. 62/449,778, filed on Jan. 24, 2017.

(51) Int. Cl.
*G06F 21/56* (2013.01)
*G06N 20/00* (2019.01)
*G06N 3/08* (2006.01)
*G06K 9/62* (2022.01)
*G06N 20/10* (2019.01)
(Continued)

(52) U.S. Cl.
CPC ......... *G06K 9/6269* (2013.01); *G06F 21/561* (2013.01); *G06F 21/563* (2013.01); *G06K 9/6247* (2013.01); *G06K 9/6255* (2013.01); *G06K 9/6256* (2013.01); *G06N 3/08* (2013.01);
(Continued)

(58) Field of Classification Search
CPC .. G06K 9/6269; G06K 9/6247; G06K 9/6255; G06K 9/6256; G06K 2009/4695; G06N 20/00; G06F 21/561
See application file for complete search history.

(56) References Cited

U.S. PATENT DOCUMENTS

2014/0090061 A1* 3/2014 Avasarala ............... G06F 21/56
726/24
2015/0324480 A1* 11/2015 Schreter ................ G06F 16/951
707/741
(Continued)

OTHER PUBLICATIONS

Arriga et al., An algorithmic theory of learning: Robust concepts and random projection, Mar. 28, 2006, Springer Science + Business Media, LLC 2006, pp. 161-182 (Year: 2006).*
(Continued)

*Primary Examiner* — Li B. Zhen
*Assistant Examiner* — William Wai Yin Kwan
(74) *Attorney, Agent, or Firm* — Jones Day

(57) ABSTRACT

Presence of malicious code can be identified in one or more data samples. A feature set extracted from a sample is vectorized to generate a sparse vector. A reduced dimension vector representing the sparse vector can be generated. A binary representation vector of reduced dimension vector can be created by converting each value of a plurality of values in the reduced dimension vector to a binary representation. The binary representation vector can be added as a new element in a dictionary structure if the binary representation is not equal to an existing element in the dictionary structure. A training set for use in training a machine learning model can be created to include one vector whose binary representation corresponds to each of a plurality of elements in the dictionary structure.

16 Claims, 5 Drawing Sheets

(51) Int. Cl.
*G06N 20/20* (2019.01)
*G06V 10/40* (2022.01)

(52) U.S. Cl.
CPC ............ *G06N 20/00* (2019.01); *G06N 20/10* (2019.01); *G06N 20/20* (2019.01); *G06V 10/513* (2022.01)

(56) References Cited

U.S. PATENT DOCUMENTS

2018/0053097 A1* 2/2018 Soni .................. G06N 5/022
2018/0101742 A1* 4/2018 Burge ................ G06K 9/00926

OTHER PUBLICATIONS

Aharon et al., K-SVD: An Algorithm for Designing Overcomplete Dictionaries for Sparse Representation, Nov. 2006, IEEE Transactions on Signal Processing, vol. 54, No. 11, pp. 4311-4322 (Year: 2006).*

Achlioptas, Dimitris, Database-friendly random projections: Johnson-Lindenstrauss with binary coins, 2003, Journal of Computer and System Sciences 66 (2003), pp. 671-687 (Year: 2003).*

Durand et al., Using Randomized Projection Techniques to Aid in Detecting High-Dimensional Malicious Applications, 49th ACM Southeast Conference, Mar. 24-26, 2011, ACM 978-1-4503-0686-7/11/03, pp. 166-172 (Year: 2011).*

* cited by examiner

DICTIONARY BASED DEDUPLICATION OF TRAINING SET SAMPLES FOR MACHINE LEARNING BASED COMPUTER THREAT ANALYSIS

RELATED APPLICATION

The current application claims priority to U.S. Pat. App. Ser. No. 62/449,778 filed Jan. 24, 2017, the contents of which are hereby fully incorporated by reference.

TECHNICAL FIELD

This disclosure relates generally to data processing and, in particular, to deduplication of training set samples for the purposes of machine learning in detecting computer threats.

BACKGROUND

Malicious software or malware, viruses, and other harmful software are typically used to disrupt computing operations, gather sensitive information, gain access to private computing systems, display unwanted advertising, and/or cause other unwanted interference with companies' businesses. Malware includes computer viruses, worms, Trojan horses, ransomware, spyware, adware, scareware, and any other malicious programs. It can be hidden in data that can be downloaded from websites, disguised as legitimate programs or programs known to be non-malicious, etc. and can be an executable code, scripts, active content, and/or other software.

Anti-virus, anti-malware software, firewalls, etc. are typically used to protect computing systems against malicious activity as well as perform recovery from attacks. However, conventional methods are not capable of accounting for malicious software that may have duplicated over time and/or may have mutated (e.g., changed its code insignificantly to disguise the original malicious code). Such conventional methods typically treat duplicated/mutated malicious code as entirely new malicious code, thereby making such methods inefficient in training machine learning models that may be used to identify presence of malicious code in data. Thus, there is a need to identify presence of duplicated/mutated malicious code for the purposes of effectively and efficiently training machine learning models.

SUMMARY

In some implementations, the current subject matter relates to a computer-implemented for identifying presence of malicious code in one or more data samples. The method can include vectorizing a feature set extracted from a sample, the vectorizing resulting in a sparse vector, generating a reduced dimension vector representing the sparse vector, creating a binary representation vector of reduced dimension vector, the creating comprising converting each value of a plurality of values in the reduced dimension vector to a binary representation, adding the binary representation vector as a new element in a dictionary structure if the binary representation is not equal to an existing element in the dictionary structure, and creating a training set for use in training a machine learning model, the training set comprising one vector whose binary representation corresponds to each of a plurality of elements in the dictionary structure.

In some implementations, the current subject matter can include one or more of the following optional elements in any feasible combination. In some implementations, the file can have a portable executable format, a document format, a file format, an executable format, a script format, an image format, a video format, an audio format, and any combination thereof. The generation of the reduced dimension vector can include randomly projecting the sparse vector into a key space. The randomly projected vector can be generated by applying a random projection to the sparse vector, where the random projection can preserve at least one and/or all pairwise distance between at least two features of in the sparse vector. The random projection can have a predetermined size.

In some implementations, each value in the plurality of values in the randomly projected vector can correspond to at least one of the following: a positive value, a negative value, and a zero value. Each binary representation can be generated by mapping the predetermined value to at least one of the following: 1 and 0. The positive value can be mapped to 1; the negative value can be mapped to 0; and the zero value can be mapped to 0.

In some implementations, the adding of the binary representation to the dictionary structure can include comparing the binary representation to the plurality of existing binary representations in the dictionary structure; determining, based on the comparing, another binary representation in the plurality of binary representations being a duplicate of the binary representation; and selecting, based on the determining, another binary representation for creating the training set. The binary representation and the other binary representation can be at least one of the following: identical binary representations, similar binary representations, and substantially similar binary representations. In some implementations, upon determination that the other binary representation is a duplicate of the binary representation, the other binary representation can be replaced with the binary representation. Alternatively, the binary representation or the other binary representation can be discarded/deleted.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
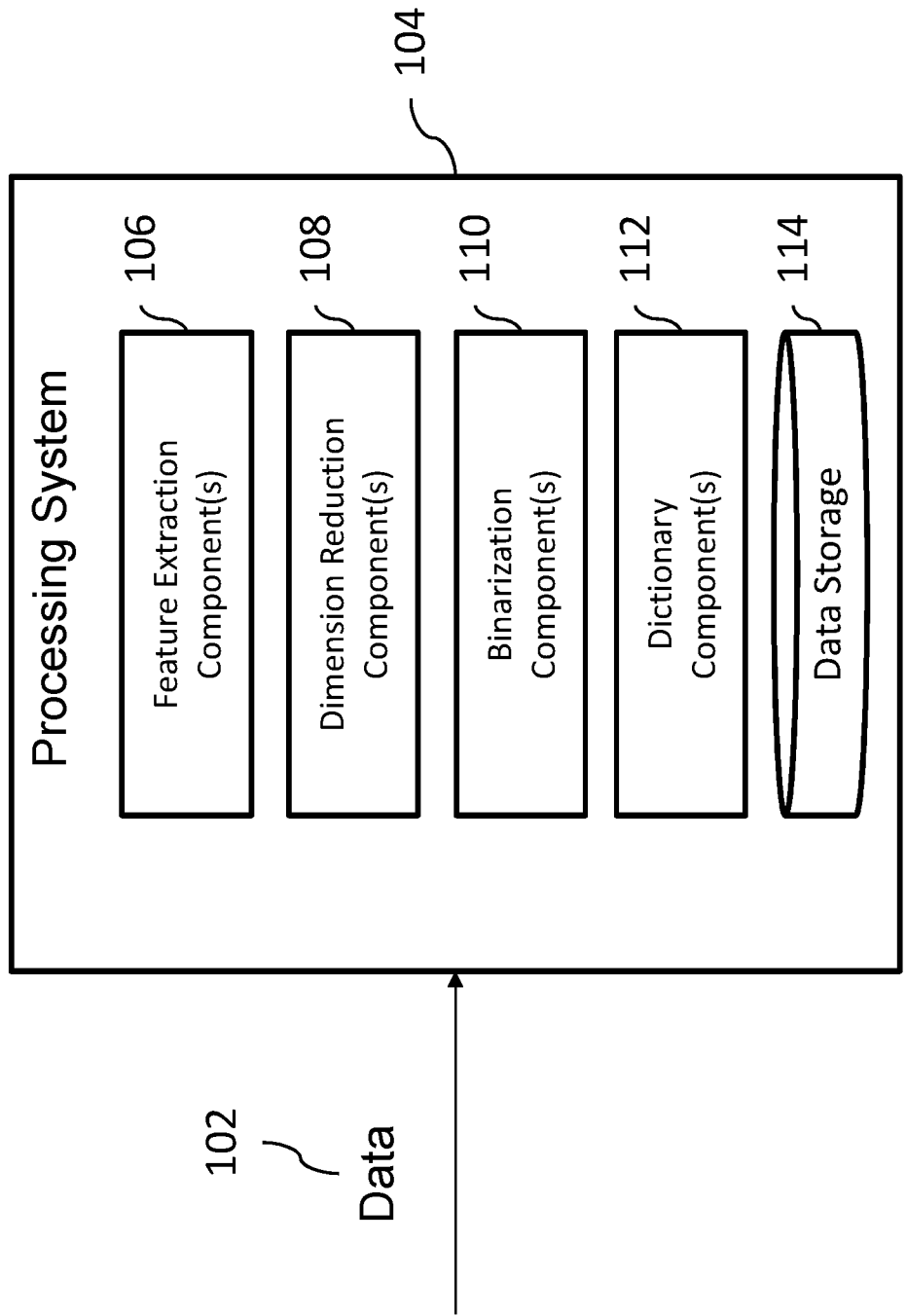
FIG. 1 illustrates an exemplary system for determination of presence of duplicates in a training dataset for the purposes of detecting existence of a malicious code, according to some implementations of the current subject matter.

In some implementations, the current subject matter relates to performing analysis of data to detect presence of malicious code. In some implementations, the current subject matter can extract a plurality of features from a sample in a plurality of samples. The sample can include, for example, a file, one or more portions of a file, and/or multiple files, where features can be independent variables that can represent a file, such as a file having a portable executable format. Once the features are extracted, a sparse feature vector can be generated. In view of a large number of potential features, the sparse feature vector can be a high-dimensionality vector. The feature vector can include values corresponding to extracted features. A dimension reduction technique can be applied to the sparse feature vector in order to reduce its dimension and generate a low dimensionality vector.

A non-limiting example of the dimension reduction technique can include a random projection, which can project the sparse vector into a key space. The random projection can reduce a number of variables (or dimensions) in the originally-generated or sparse feature vector as well as preserve any pairwise distances between variables from the original feature vector.

A binarization process can be applied to the generated randomly projected vector to produce a binary representation of the randomly projected vector. The binary representation can be representative of values corresponding to the features contained in the randomly projected vector. The binarization process can convert or map these values to a space of [0, 1]. The binary representation can be compared to other binary representations contained in a dictionary structure to determine whether it is a duplicate of any existing binary representations. A dictionary structure can be an organized data structure that can include a unique entry for each binary representation and that can allow addition of further unique entries corresponding to new binary representations as well as modification and/or deletion of the entries. If the binary representation is a duplicate of another binary representation, it is not added to the dictionary structure. If it is not, the binary representation is added. Alternatively, if the binary representation is a duplicate of another binary representation in the dictionary structure, the generated binary representation can be selected to replace the existing binary representation in the dictionary structure. The binary representations contained in the dictionary structure can be used to generate a vector (e.g., a binary representation vector) or an exemplar that can be used for computing a training dataset for training a machine learning model in order to identify a file containing a malicious code. In this manner, the dictionary structure can be constructed to include only unique binary representations of randomly projected vector representations of feature vectors.

Some of the advantages of the current subject matter can include reduction of a number of duplicates or substantial duplicates that may be determined for inclusion in the training set. Such duplicates can be samples that are either identical, substantially identical, similar, and/or substantially similar, to one another. The similarity of samples can stem from having data, e.g., code, viruses, malware, etc., be duplicated and/or undergo minor variations (e.g., mutate) one or more times during a period of time. The number of duplicates or near duplicates of the same data that can be created can be significant over time (e.g., 100 s, 1000 s, etc. duplicates), which can consume significant storage space in the training dataset and thereby affect training of a machine learning model, as well as eventual detection of presence of malicious code. The current subject matter can determine that these duplicates or near duplicates are essentially the same data that can be represented by one exemplar, which can be included in the training dataset. In some exemplary non-limiting implementations, use of exemplars can reduce the number of duplicates in the training dataset by as much as 30% or more.

In some implementations, the current subject matter can extract features from portable executable ("PE") format files. PE format files can be structured files that are used by the WINDOWS operating system and can include executables, object code, DLLs, FON Font files, and/or any other file types. Structured files can contain any additional data including resources (e.g., images, text, etc.) and descriptive and/or prescriptive metadata and, as such, are often used for malicious purposes such as insertion of malware. Further, the structured file can take varying forms including, but not limited to, PE format files, disk operating system ("DOS") executable files, new executable ("NE") files, linear executable ("LE") files, executable and linkable format ("ELF") files, JAVA Archive ("JAR") files, SHOCKWAVE/FLASH ("SWF") files, and/or any other files.

FIG. 1 illustrates an exemplary system 100 for detecting existence of malicious code in one or more data samples, according to some implementations of the current subject matter. The system 100 can include a processing system 104, which can include feature extraction component(s) 106, dimension reduction component(s) 108, binarization component(s) 110, dictionary component(s) 112, and a data storage component 114. The data (or data samples) 102 can be any data, programs, functions, etc. (e.g., PE format files, a document format, a file format, an executable format, a script format, an image format, a video format, an audio format, and any combination thereof etc.) that can be received by the processing system 104. The data 102 can be received by the processing system 104 via a communications network, e.g., an Internet, an intranet, an extranet, a local area network ("LAN"), a wide area network ("WAN"), a metropolitan area network ("MAN"), a virtual local area network ("VLAN"), and/or any other network. The data 102 can be received via a wireless, a wired, and/or any other type of connection. The processing system 104 can be implemented using software, hardware and/or any combination of both. The system 104 can also be implemented in a personal computer, a laptop, a server, a mobile telephone, a smartphone, a tablet, and/or any other type of device and/or any combination of devices. The component(s) 106-114 can be separate components and/or can be integrated into one or more single computing components.

The feature vector component(s) 106 can perform analysis of the data 102 and generate one or more sparse vectors to represent the data 102. For example, each file and/or a portion of a file in the data 102 can be represented as a sparse vector. The feature vector can be an n-dimensional vector containing numerical features representative of each sample of data. For example, for an image, the features can correspond to pixels of the image; for a text, the features can correspond to terms/number of times a term has occurred in the text; etc. In some implementations, feature extraction can be accomplished by parsing the data 102 to extract features, for example as described in co-owned U.S. Pat. No. 9,262,296, filed Jan. 31, 2014, issued Feb. 16, 2016, and entitled "Static Feature Extraction From Structured Files", the disclosure of which is incorporated herein by reference in its entirety. The sparse vector can be a one-dimensional array of elements, which elements of the vector have mostly zero values. In view of a potentially large number of features contained in the data samples, the generated feature vectors can have a high dimension. To reduce dimensionality of the feature vectors, dimension reducing component(s) 108 can be used.

The dimension reducing component(s) 108 can generate reduced-dimension vectors of features. In some exemplary implementations, the dimension reducing component(s) 108 can use random projection and/or any other dimension reducing technique to reduce dimensionality of the original feature vector. Application of the random projection can preserve one or more or all pairwise distances between features/elements contained in the original high-dimension feature vectors. For example, an original feature space, as represented by the original high-dimension feature vector(s), can have a significant number of features (e.g., millions), e.g., can have an N-dimension. Random projection can generate a reduced-dimension or a low-dimension vector having an M-dimension, where M is much smaller than N. In some exemplary implementations, M can be orders of magnitude smaller by N by, e.g., M can correspond to thousands of features and N can correspond to millions of features (e.g., 3 orders of magnitude). The dimension of the randomly projected vector can be selected to ensure adequate representation of the samples of data.

Once the randomly projected vector is generated, a binarization process can be applied using the binarization component(s) 110. The binarization process can convert or map values corresponding to features in the randomly projected vector to a space of [0, 1] to generate binary representations of the features in the randomly projected vector. In particular, each such value can be a positive value, a negative value, or a zero value. The mapping can convert the positive value to 1, a negative value to 0, and a zero value to 0.

Figure 3:
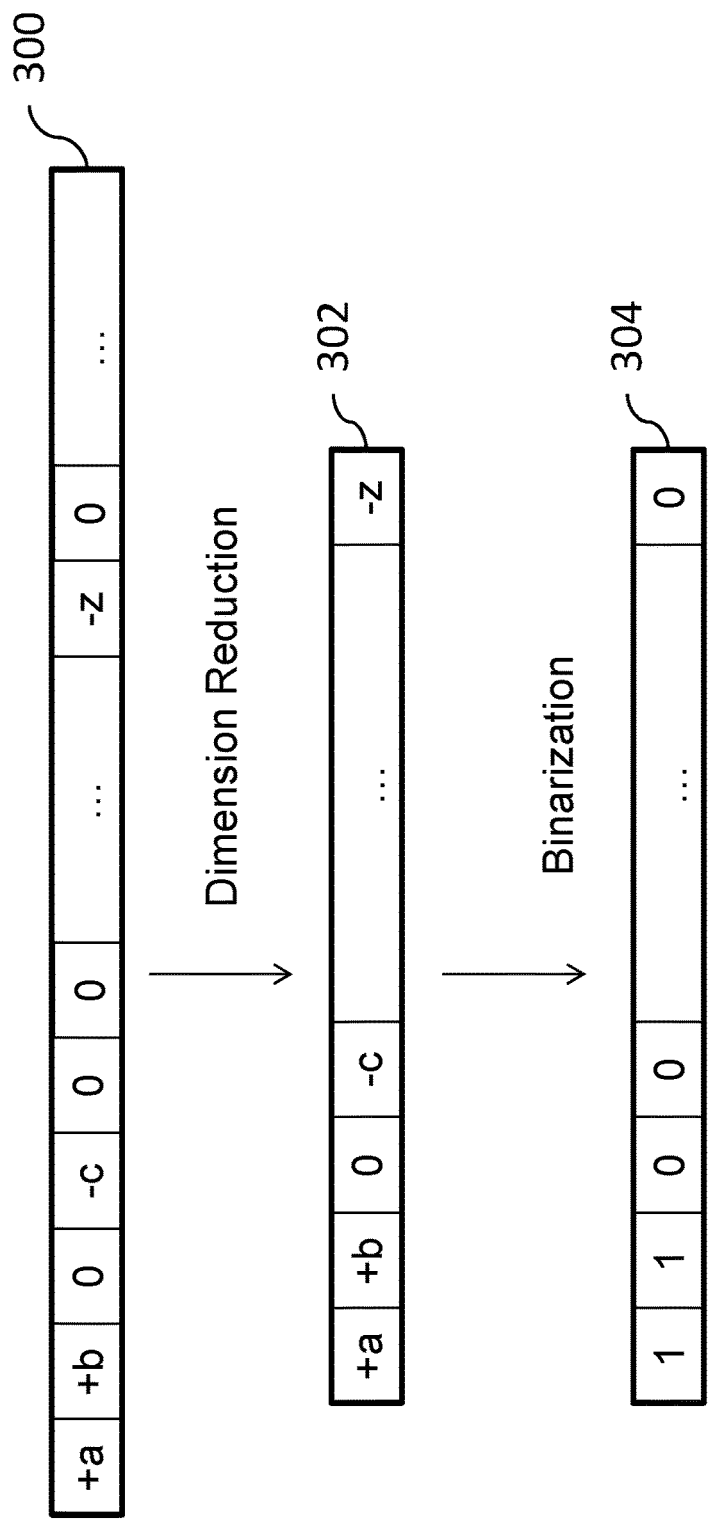
FIG. 3 illustrates an exemplary dimension reduction and binarization processes, according to some implementations of the current subject matter.

FIG. 3 illustrates an exemplary dimension reduction and binarization process being applied to a randomly projected vector. The dimension reduction, e.g., random projection, can process a sparse vector 300 (e.g., [+a, +b, 0, −c, 0, 0, . . . ]) to generate a randomly projected vector, where the sparse vector 300 is being projected into a key space, which contains values corresponding to features in the received data samples. The randomly projected vector 302 can have a lower dimension than the original dimension of the sparse vector 300, where the random projection preserves all pairwise distances between points of the sparse vector 300.

The resulting randomly projected vector 302 (e.g., [+a, +b, 0, −c, . . . , −z]) can include positive, negative or zero values. The values of the randomly projected vector 302 can be used during the binarization process to generate binary representations of the values.

The binary representations or bit vectors (or vectors resulting from the converting or mapping applied by the binarization process) 304 can include only 0 and 1 values. The binarization process can convert each value in the randomly projected vector 302 to values of 0 or 1, i.e., a space of [0, 1]. For example, positive values (e.g., +a, +b) of the randomly projected vector 302 can be converted to 1 s in the binary representation 304; negative values (e.g., −c) or zero values in the randomly projected vector 302 can be converted to 0 s in the binary representation 304.

The generated bit vectors or binary representations can be compared to one another (e.g., those that can be stored in a dictionary structure) to determine whether or not they are identical, substantially identical, similar, and/or substantially similar for the purposes of identifying duplicates. If the binary representation vector 304 is determined to be duplicate of a binary representation already stored in the dictionary structure, the vector 304 would not be added to the dictionary structure. Alternatively, once one or more duplicate binary representations are identified, a single binary representation 304 can be selected as an exemplar for inclusion in the dictionary structure. The dictionary structure can then be used to compute a training set for training a learning model. The training set can include a vector whose binary representation corresponds to binary representations or elements contained in the dictionary structure.

Referring back to FIG. 1, the dictionary component(s) 112 can be used to generate a dictionary structure that can include a collection of non-duplicate binary representations. For example, if the random projection dimension reduction technique is used, the dictionary structure can include a listing of unique binary representations of values resulting from application of the random projection of the sparse vector.

In some implementations, an exemplar can be selected from the dictionary structure based on a determination that any newly determined binary representation matches binary representations already existing in the dictionary structure. As stated above, the exemplar(s) can be included in a training dataset for training of a machine learning model to identify presence of a malicious code in the data 102.

The data storage component 114 can be used for storage of data processed by the system 104 and can include any type of memory, e.g., a temporary memory, a permanent memory, and/or any other type of memory and/or any combination thereof.

Figure 2:
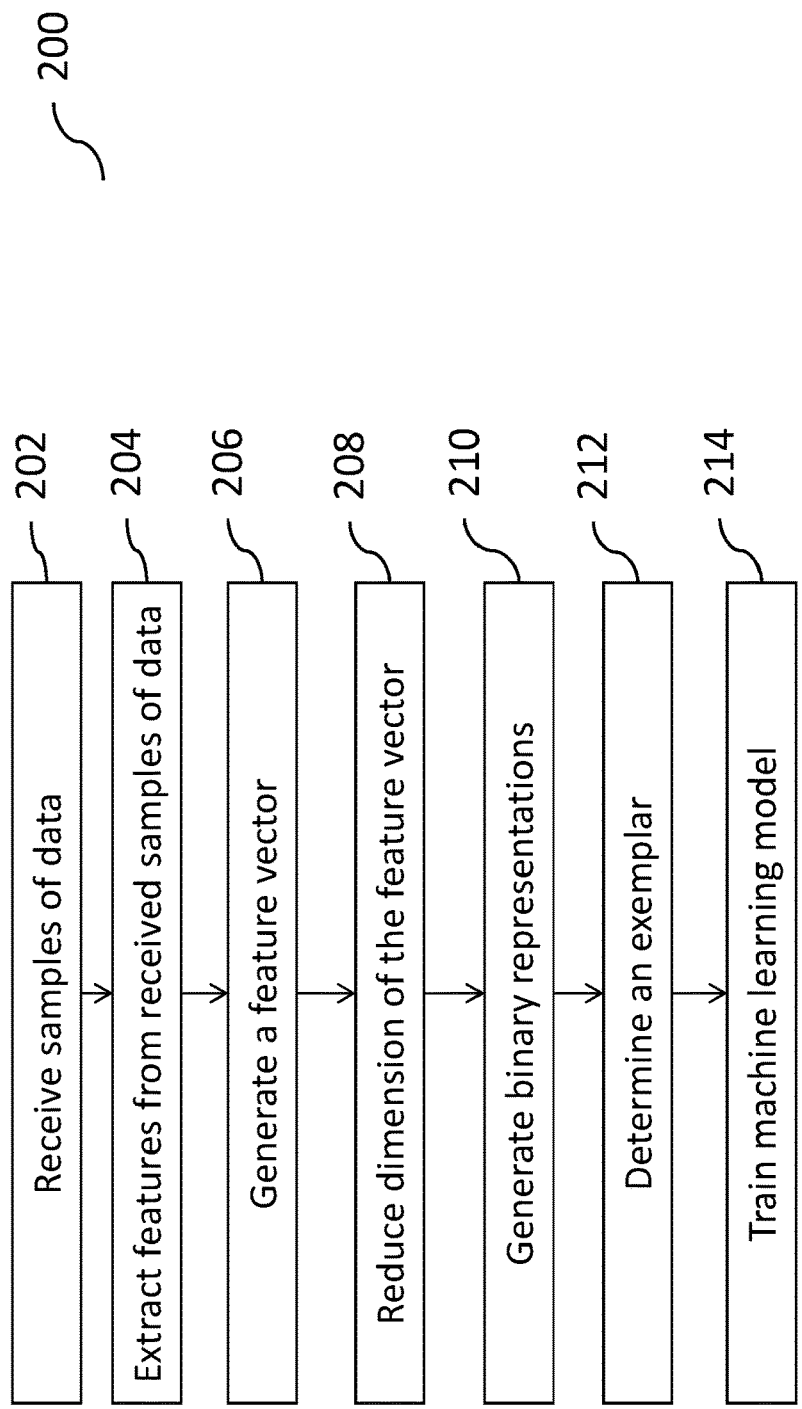
FIG. 2 illustrates an exemplary process for determination of presence of duplicates in a training dataset for the purposes of detecting existence of a malicious code, according to some implementations of the current subject matter.

FIG. 2 illustrates an exemplary process 200 for determination of presence of duplicates in a training dataset for the purposes of detecting existence of a malicious code, according to some implementations of the current subject matter. The process 200 can be performed by system 100 (as shown in FIG. 1). At 202, samples of data can be received at a processing node (e.g., processing system 104 shown in FIG. 1). The samples of data can include PE format files and/or any other files. At 204, features can be extracted from the received data samples. The features can be extracted using any technique, such as by parsing, as discussed, for example, in the co-owned U.S. Pat. No. 9,262,296, filed Jan. 31, 2014, issued Feb. 16, 2016, and entitled "Static Feature Extraction From Structured Files", the disclosure of which is incorporated herein by reference in its entirety.

At 206, a sparse vector can be generated based on the extracted features. As stated above, the sparse vector can have a high-dimensionality and can include zeros and values corresponding to features in the samples that have been received. In some implementations, each value in the sparse vector can be assigned a predetermined position or a bucket within the sparse vector, as shown in FIG. 3, the generated sparse vector 300 can have a larger dimension than the vector 302 generated after application of the dimension reduction technique, e.g., random projection.

Referring back to FIG. 2, at 208, a dimension reduction technique (e.g., random projection) can be applied to the generated sparse vector. This can result in a lower dimension vector (e.g., vector 302 as shown in FIG. 3). If random projection dimension reduction technique is used, the values corresponding to features contained in the sparse vector can be projected into a reduced dimension, thereby generating a randomly projected vector (e.g., randomly projected vector 302 as shown in FIG. 3). The dimension of the resulting reduced dimension vector can be predetermined prior to the application of the dimension reduction technique. In some implementations, such dimension can be experimentally determined. In case of a random projection, having a small dimension of the randomly projected vector can ultimately result in a greater number of samples appearing as duplicates of one another (i.e., as the bit vector or binary representation 304 shown in FIG. 3 will appear to be identical/similar to a significant number of other bit vectors/binary representations 304). Conversely, having a large dimension of the randomly projected vector can result in a smaller number of samples (or no samples) appearing as duplicates of one another i.e., as the bit vector or binary representation 304 shown in FIG. 3 might not appear to be identical/similar to any other bit vectors/binary representations 304).

At 210, binary representations of the elements in the reduced dimensionality vector 302 can be generated. As stated above, the binary representations can be generated based on a converting or mapping of values corresponding to features in the reduced dimension vector (i.e., randomly projected vector 302 shown in FIG. 3) to a [0, 1] space to generate a bit vector or a binary representation (i.e., bit vector 304 shown in FIG. 3). The mapping will map positive values to 1, negative values to 0 and zero values to 0. For example, as shown in FIG. 3, "+a" value of vector 302 will be mapped to 1 in vector 304, "+b" value will be mapped to 1; "0" value will be mapped to 0; "−c" value will be mapped to 0; etc.

Referring back to FIG. 2, at 212, an exemplar can be determined. The determination of an exemplar can be made based on a comparison of the generated binary representations to those existing in the dictionary structure. If a determination is made that the generated binary representation is a duplicate of another already contained in the dictionary structure, the generated binary representation is not added to the dictionary structure. Alternatively, the generated binary representation can be used to replace a binary representation already existing in the dictionary structure. The duplicate binary representations can include binary representations that can be at least one of the following: identical, substantially identical, similar, and/or substantially similar. The comparison of binary representations can be made in real time, e.g., as soon as new binary representations are generated. The binary representations can also be compared to binary representations that may have been previously determined and/or are stored in a dictionary structure (as for example stored in the data storage 114, shown in FIG. 1). If a duplicate binary representation is identified (whether newly computed or already stored in the dictionary structure), the other duplicate binary representations can be discarded (or deleted) and are not selected for storage in the dictionary structure. The binary representations included in the dictionary can be used to compute or create a training dataset, where the training dataset can be vector whose binary representation corresponds to plurality of elements in the dictionary.

At 214, the generated dataset can be used for training a machine learning model for the purposes of identifying presence of malicious code in the data. In this manner, and consistent with the current subject matter, a training dataset having a significantly smaller size than one that does not undergo a de-duplication process can be obtained. The reduced training set is nonetheless representative of the types of samples needed by the machine learning model to accurately characterize and analyze unknown samples.

Figure 4:
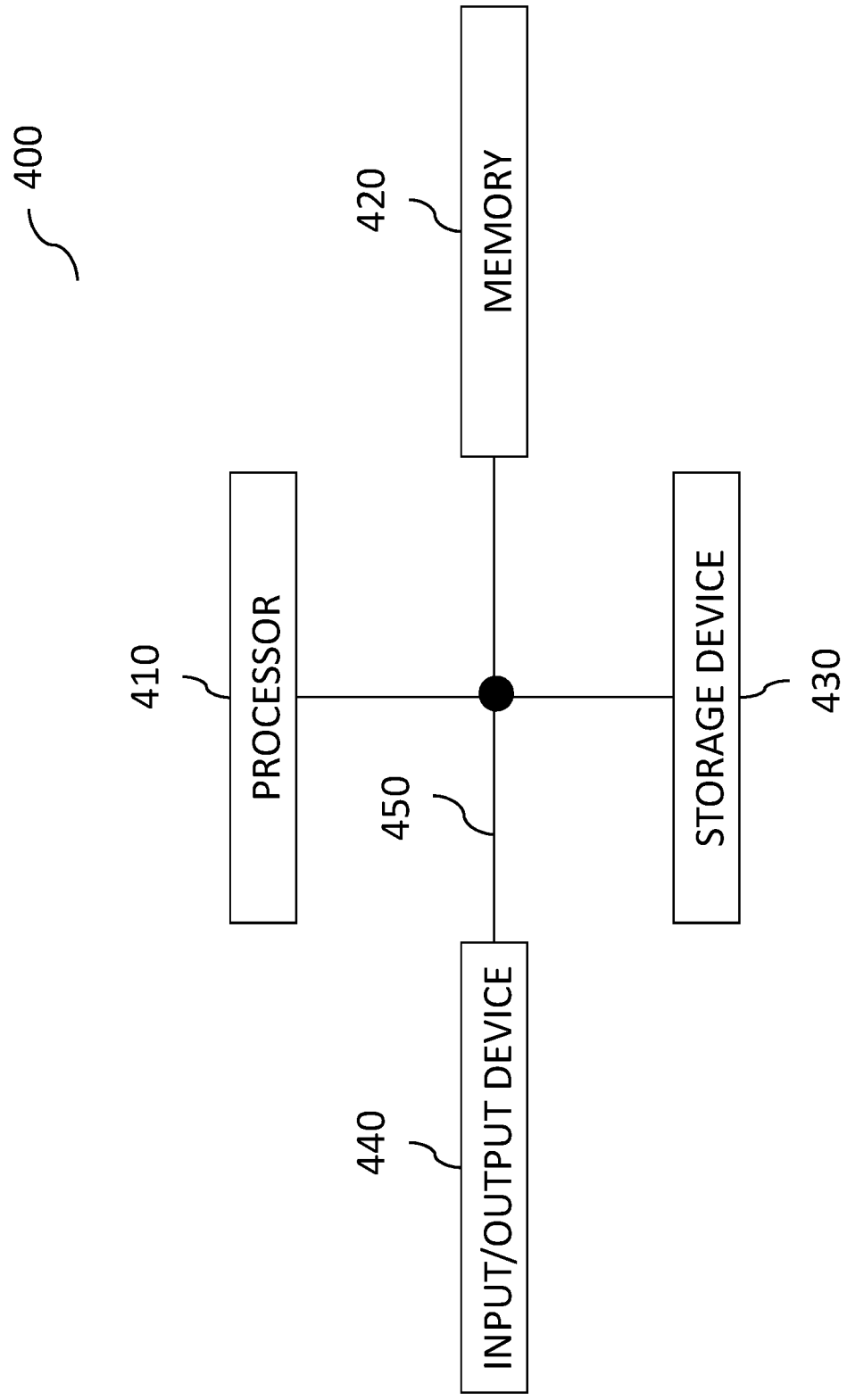
FIG. 4 illustrates an exemplary system, according to some implementations of the current subject matter.

In some implementations, the current subject matter can be configured to be implemented in a system 400, as shown in FIG. 4. The system 400 can include a processor 410, a memory 420, a storage device 430, and an input/output device 440. Each of the components 410, 420, 430 and 440 can be interconnected using a system bus 450. The processor 410 can be configured to process instructions for execution within the system 400. In some implementations, the processor 410 can be a single-threaded processor. In alternate implementations, the processor 410 can be a multi-threaded processor. The processor 410 can be further configured to process instructions stored in the memory 420 or on the storage device 430, including receiving or sending information through the input/output device 440. The memory 420 can store information within the system 400. In some implementations, the memory 420 can be a computer-readable medium. In alternate implementations, the memory 420 can be a volatile memory unit. In yet some implementations, the memory 420 can be a non-volatile memory unit. The storage device 430 can be capable of providing mass storage for the system 400. In some implementations, the storage device 430 can be a computer-readable medium. In alternate implementations, the storage device 430 can be a floppy disk device, a hard disk device, an optical disk device, a tape device, non-volatile solid state memory, or any other type of storage device. The input/output device 440 can be configured to provide input/output operations for the system 400. In some implementations, the input/output device 440 can include a keyboard and/or pointing device. In alternate implementations, the input/output device 440 can include a display unit for displaying graphical user interfaces.

Figure 5:
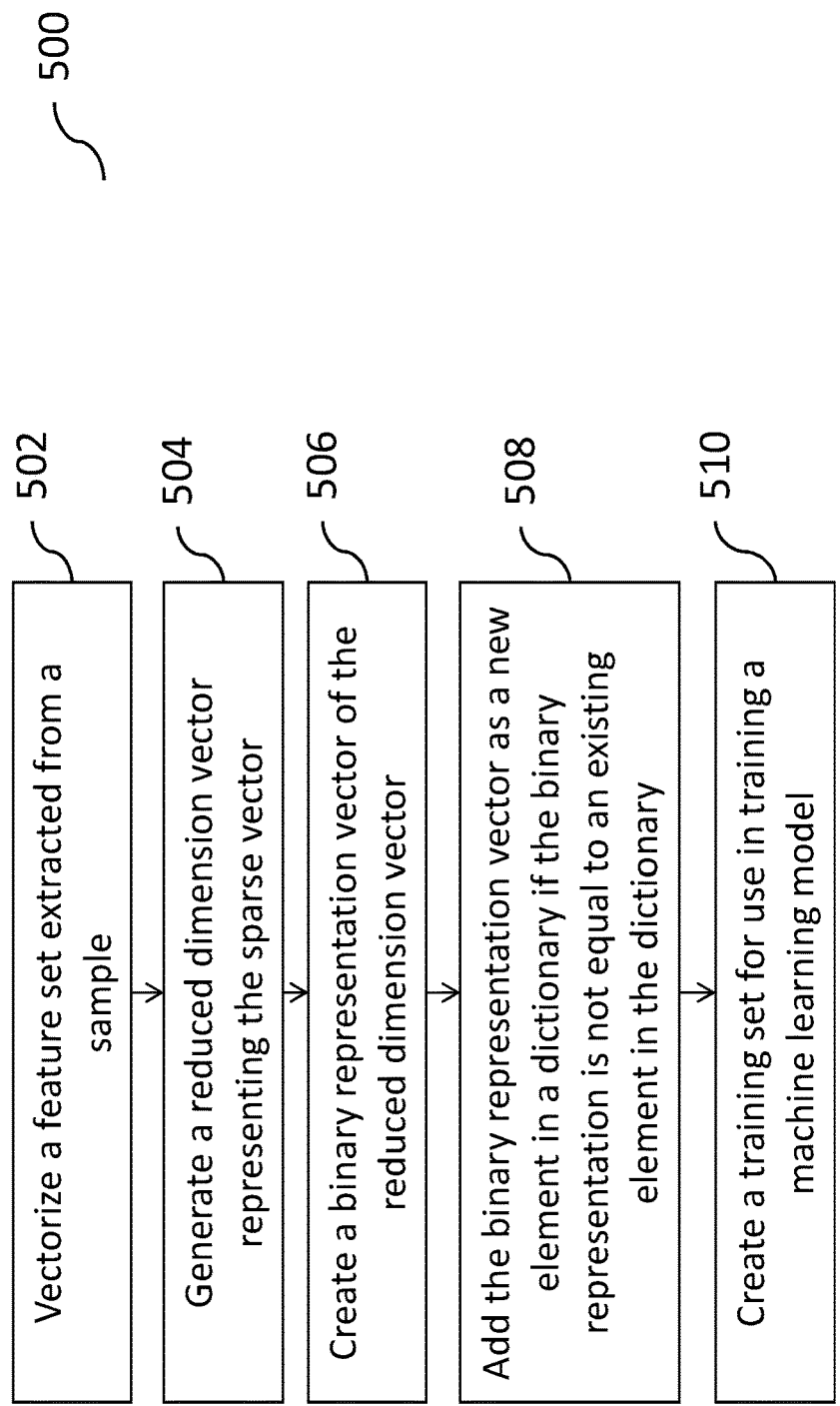
FIG. 5 illustrates an exemplary method, according to some implementations of the current subject matter.

FIG. 5 illustrates an exemplary method 500 for identifying presence of malicious code in one or more data samples, according to some implementations of the current subject matter. At 502, a feature set extracted from a sample can be vectorized. Vectorization of the feature set can result in a sparse vector. At 504, a dimension reduction technique, such as a random projection, can be applied to the sparse vector to generate a reduced dimension vector that can represent the sparse vector. At 506, a binary representation vector can be created to represent the reduced dimension vector. This can include converting each value of a plurality of values in the reduced dimension projected vector to a binary representation (e.g., [0, 1] space). At 508, the binary representation vector can be added as a new element in a dictionary structure if the binary representation is not equal to an existing element in the dictionary structure (e.g., if the binary representation is not a duplicate of other binary representations already existing in the dictionary structure). At 510, a training set for use in training a machine learning model can be created or computed. The training set can include a vector whose binary representation can correspond to each of a plurality of elements in the dictionary structure.

In some implementations, the current subject matter can include one or more of the following optional elements. In some implementations, the file can have a portable executable format, a document format, a file format, an executable format, a script format, an image format, a video format, an audio format, and any combination thereof. The generation of reduced dimension vector can include randomly projecting the sparse vector into a key space. The randomly projected vector can be generated by applying a random projection to the sparse vector, where the random projection can preserve at least one and/or all pairwise distance between at least two features of in the sparse vector. The random projection can have a predetermined size.

In some implementations, each value in the plurality of values in the randomly projected vector can correspond to at least one of the following: a positive value, a negative value, and a zero value. Each binary representation can be generated by mapping the predetermined value to at least one of the following: 1 and 0. The positive value can be mapped to 1; the negative value can be mapped to 0; and zero value can be mapped to 0.

In some implementations, addition of the binary representation to the dictionary structure can include comparing the binary representation to the plurality of existing binary representations in the dictionary structure; determining, based on the comparing, another binary representation in the plurality of binary representations being a duplicate of the binary representation; and selecting, based on the determining, another binary representation for creating the training set. The binary representation and the other binary representation can be at least one of the following: identical binary representations, similar binary representations, and substantially similar binary representations. In some implementations, upon determination that the other binary representation is a duplicate of the binary representation, the other binary representation can be replaced with the binary representation. Alternatively, the binary representation or the other binary representation can be discarded/deleted.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method for identifying a presence of malicious code in one or more data samples, the method comprising:
    receiving a plurality of samples at a processing node that each comprise one or more files, the plurality of samples being selected to train a machine learning model to identify a presence of malicious code in one or more data samples, at least a portion of the plurality of samples comprising malicious code;
    extracting features from each of the samples to result in a corresponding feature set, at least a portion of the extracted features being associated with malicious code;
    vectorizing, for each of the plurality of samples, the corresponding feature set extracted from the sample, the vectorizing resulting in a sparse vector comprising a one-dimensional array of elements having at least a portion of non-binary values including positive, negative, and zero values with a majority of the elements in the sparse vector having a zero value;
    generating, for each sparse vector, a reduced dimension vector representing the sparse vector comprising elements having at least a portion of non-binary values including positive, negative, and zero values;
    creating, for each reduced dimension vector, a binary representation vector of the reduced dimension vector, the creating comprising converting each value of a plurality of values in the reduced dimension vector to a binary representation such that elements of the binary representation vector each have values of either zero or one;
    adding each of the binary representation vectors as a new element in a dictionary structure when the corresponding binary representation is not equal to an existing element in the dictionary structure;
    creating a training set for use in training a machine learning model, the training set comprising a plurality of vectors that each have an associated binary representation that corresponds to a different one of a plurality of elements in the dictionary structure, the machine learning model, when trained using the training set, being configured to identify the presence of malicious code in one or more data samples; and
    training the machine learning model using the training set; and
    deploying the trained machine learning model to identify the presence of malicious code in one or more data samples.

2. The method according to claim 1, wherein the sample is derived from a file that has a portable executable format, a document format, a file format, an executable format, a script format, an image format, a video format, an audio format, or any combination thereof.

3. The method according to claim 1, wherein the generating comprises:
    randomly projecting the sparse vector into a key space, and
    wherein the reduced dimension vector comprises a randomly projected vector.

4. The method according to claim 3, wherein the randomly projected vector is generated by applying a random projection to the sparse vector; and
    wherein the random projection preserves all pairwise distances between features in the sparse vector.

5. The method according to claim 4, wherein the random projection has a predetermined size.

6. The method according to claim 1, wherein each binary representation is generated by mapping the predetermined value to at least one of the following: 1 and 0; and
    wherein
        the positive value is mapped to 1;
        the negative value is mapped to 0; and
        zero value is mapped to 0.

7. The method according to claim 1, wherein the adding further comprises:
    comparing the binary representation to the plurality of existing binary representations in the dictionary structure;
    determining, based on the comparing, another binary representation in the plurality of binary representations being a duplicate of the binary representation; and
    selecting the determined other binary representation for creating the training set.

8. The method according to claim 7, further comprising: performing, upon determination that the determined other binary representation is a duplicate of the binary representation, at least one of replacing the determined other binary representation with the binary representation, and discarding one of the binary representation and the determined other binary representation.

9. The method according to claim 1, wherein at least one of the vectorizing, the generating, the creating the binary representation, the adding, and the creating the training set is performed by at least one processor of at least one computing system, and wherein the computing system comprises at least one of the following: a software component, a hardware component, and any combination thereof.

10. A system comprising computer hardware configured to perform operations for identifying a presence of malicious code in one or more data samples comprising:
- receiving a plurality of samples at a processing node that each comprise one or more files, the plurality of samples being selected to train a machine learning model to identify a presence of malicious code in one or more data samples, at least a portion of the plurality of samples comprising malicious code;
- extracting features from each of the samples to result in a corresponding feature set, at least a portion of the extracted features being associated with malicious code;
- vectorizing, for each of the plurality of samples, the corresponding feature set extracted from the sample, the vectorizing resulting in a sparse vector comprising a one-dimensional array of elements having at least a portion of non-binary values including positive, negative, and zero values with a majority of the elements in the sparse vector having a zero value;
- generating, for each sparse vector, a reduced dimension vector representing the sparse vector comprising elements having at least a portion of non-binary values including positive, negative, and zero values;
- creating, for each reduced dimension vector, a binary representation vector of the reduced dimension vector, the creating comprising converting each value of a plurality of values in the reduced dimension vector to a binary representation such that elements of the binary representation vector each have values of either zero or one;
- adding each of the binary representation vectors as a new element in a dictionary structure when the corresponding binary representation is not equal to an existing element in the dictionary structure;
- creating a training set for use in training a machine learning model, the training set comprising a plurality of vectors that each have an associated binary representation that corresponds to a different one of a plurality of elements in the dictionary structure, the machine learning model, when trained using the training set, being configured to identify the presence of malicious code in one or more data samples;
- training the machine learning model using the training set; and
- deploying the trained machine learning model to identify the presence of malicious code in one or more data samples.

11. The system according to claim 10, wherein the sample is derived from a file that has a portable executable format, a document format, a file format, an executable format, a script format, an image format, a video format, an audio format, or any combination thereof.

12. The system according to claim 10, wherein the generating comprises:
- randomly projecting the sparse vector into a key space, and
- wherein the reduced dimension vector comprises a randomly projected vector.

13. The system according to claim 12, wherein the randomly projected vector is generated by applying a random projection to the sparse vector; and
- wherein the random projection preserves all pairwise distances between features in the sparse vector.

14. The system according to claim 13, wherein the random projection has a predetermined size.

15. The system according to claim 10, wherein each binary representation is generated by mapping the predetermined value to at least one of the following: 1 and 0; and wherein
- the positive value is mapped to 1;
- the negative value is mapped to 0; and
- zero value is mapped to 0.

16. The system according to claim 10, wherein the adding further comprises:
- comparing the binary representation to the plurality of existing binary representations in the dictionary structure;
- determining, based on the comparing, another binary representation in the plurality of binary representations being a duplicate of the binary representation; and
- selecting, based on the determining, the determined other binary representation for creating the training set.

* * * * *